April 23, 1935.   H. MARLES   1,998,728
AUTOMATICALLY ADJUSTABLE BUSHING FOR STEERING WHEEL STEMS
Filed Oct. 5, 1931
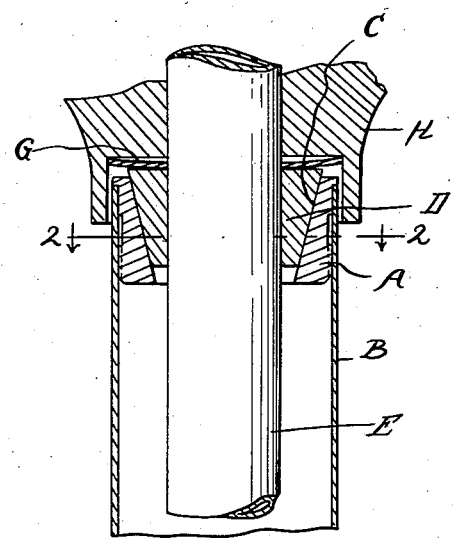
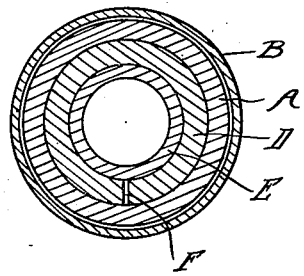
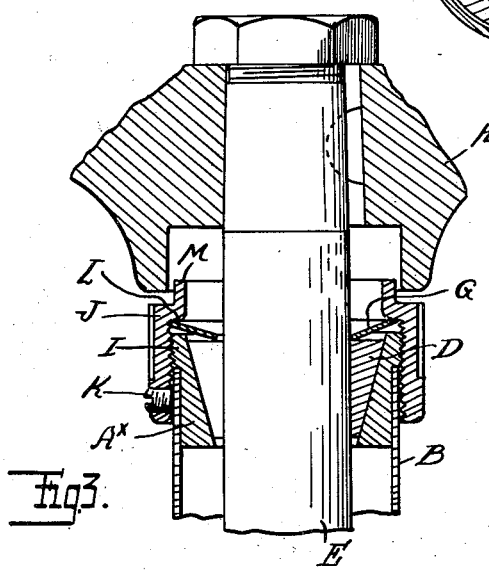
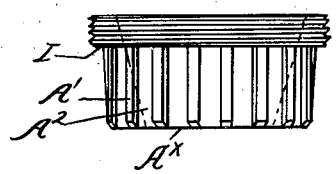
INVENTOR
Henry Marles
BY Whittemore Hulbert
Whittemore &Belknap
ATTORNEYS Patented Apr. 23, 1935

1,998,728

UNITED STATES PATENT OFFICE 1,998,728

AUTOMATICALLY ADJUSTABLE BUSHING FOR STEERING WHEEL STEMS

Henry Marles, Detroit, Mich., assignor to Gemmer Manufacturing Company, Detroit, Mich., a corporation of Michigan Application October 5, 1931, Serial No. 567,078

2 Claims. (Cl. 308—71)

The invention relates to bushing bearings for supporting the rotary stems of steering mechanisms in the steering posts. It is the object of the invention to obtain a construction that will compensate first, for variations in sizes of tubes used in the original steering assembly and second, that will automatically adjust to compensate for wear so that at all times the construction is free from lost motion or rattle. With this object in view the invention consists in the construction as hereinafter set forth.

In the drawing:

Figure 1 is a longitudinal section through a portion of the post and stem of a steering mechanism;

Figure 2 is a cross section on line 2—2 of Figure 1.

Figure 3 is a section similar to Figure 1 showing a modified construction, and

Figure 4 is an elevation of one of the elements used in Figure 3.

In the manufacture of steering gears it is usual to employ commercial drawn steel tubing for the rotary stem which is attached to the hand wheel and for the non-revoluble post or column in which said stem is journaled. As such commercial tubing can not be maintained exactly uniform in size it is impossible to use a standard size rigid bushing which will exactly fit both the inner and outer diameters. Consequently it is necessary either to form a loose fit, if a bushing of rigid material is employed, or to form said bushing of a resiliently compressible material that will compensate for variations in the size of the tubing. My improved construction has the advantages of a rigid bearing combined with the adjustment of the compressible bearings and is constructed as follows:

A is an annular member for fitting within the steering post B and which is provided with a conical inner surface C. D is another annular member which has an external conical face and internally is of a diameter which will receive a steering stem E of maximum size. The member D is, however, radially split at F so as to permit of contraction by an axial movement of the same in relation to the member A. This axial movement is accomplished by the resilient pressure of a dished washer G which in the construction shown in Figure 1 is arranged between the upper end of the member D and the hub of the steering wheel H. I prefer, however, to provide an abutment which is adjustably positioned in relation to the member $A^\times$ and is independent of the steering column E. Such a construction is shown in Figure 3 in which I is an outwardly extending flange in the upper end of the member $A^\times$, peripherally screw threaded to receive an internally threaded collar J. The collar J is of an internal diameter to fit over the steering post B to which it may be locked in different positions of adjustment by means of a set screw K. The upper end of the collar J has an inwardly extending flange L which forms the abutment for the dished washer G and is further provided with an upwardly extending flange M adapted to fit within a recess in the hub H.

As has been stated, the tube from which the steering stem E and post B are formed will vary slightly in dimensions and to facilitate the fitting of the member $A^\times$ within the post B I provide the former with a series of longitudinally extending ribs A' shown in Figure 4 with grooves or relieved portions $A^2$ therebetween. Thus when the member $A^\times$ is driven into a tube B slightly under size the relieved portions $A^2$ will permit of the slight flattening of arcs in the tube to accommodate the member $A^\times$. Also as the member $A^\times$ is preferably formed of a die casting of relatively soft metal the ribs A' may be slightly flattened or deformed in entering a small diameter tube.

In assembling the parts the steering stem E being arranged in concentric relation within the post B, the member A is then inserted within said port as just described. The split member D is then placed upon the stem and moved downward into engagement with the member A, after which the spring washer G is sleeved upon the stem. With the construction shown in Figure 1 the abutment for the washer G is formed by the hub H of the steering wheel which latter is first forced downward upon the stem E to place the washer under the desired initial tension and is then secured to the stem to maintain this tension. However, the preferable construction is shown in Figure 3 where after the placing of the washer G upon the stem the member J is sleeved on the stem and screwed down on the threaded flange I. To abut the flange L against the washer the collar is screwed down to give the desired tension to the washer G after which the parts are secured in this position by tightening the set screw K. The initial tension of the washer G is sufficient to close the split bearing D about the stem E in case the latter is under size while in case of an over size tube E the member D will be expanded when placed in engagement therewith. In either case, when wear occurs in the bearing the spring washer G will automatically take up the lost motion, moving the member D downward within the member A and contracting the same about the stem E.

The construction as described is simple and inexpensive to manufacture, effectively prevents rattle, is easily assembled and will automatically compensate for wear.

What I claim as my invention is:

1. The combination of a stationary tube, a rotatable shaft therein, an annular member within said tube surrounding said shaft, said member having a conical inner surface and a ribbed outer surface and being formed of relatively soft material permitting of the deformation of said ribs when pressed into a tubular member of slightly smaller internal diameter, said annular member also having an outwardly extending portion having a shouldered engagement with the end of said tube and peripherally threaded, a radially split annular member sleeved upon said shaft having a conical outer surface bearing against the conical surface of said first mentioned member, an annular member outside said tube internally threaded to engage the threaded portion of said first mentioned annular member, and also provided with an inwardly extending portion forming a shoulder and a resilient dished washer having its inner portion bearing against said split conical member and its outer portion bearing against the shoulder on said outer annular member whereby the rotary adjustment of said outer annular member will place said resilient dished washer under tension to press said split conical member into the conical outer member.

2. The combination of a stationary tube, a rotatable shaft therein, an annular member fixed within said tube surrounding said shaft, said member having a conical inner surface, an inner member sleeved on said shaft and having a conical outer surface for fitting within said annular member, said inner member being radially split to permit of contraction in diameter, a dished resilient washer surrounding said shaft and bearing against the large end of said inner member, and a member accessible from outside said tube forming an abutment for the opposite side of said dished resilient washer, said member being adjustable relative to said tube to place said washer under tension and to thereby press said split conical member into said outer conical member to take up clearance between the same and said shaft.

HENRY MARLES.